United States Patent
Söderholm et al.

(12)

(10) Patent No.: US 6,210,115 B1
(45) Date of Patent: Apr. 3, 2001

(54) IMPELLER ARRANGEMENT IN A MEASURING DEVICE

(75) Inventors: Arne Söderholm; Olle Söderholm, both of Bromma (SE)

(73) Assignee: S.E.G. Mekanik AB, Amal (SE)

( * ) Notice: Subject to any disclaimer, the term of this patent is extended or adjusted under 35 U.S.C. 154(b) by 0 days.

(21) Appl. No.: 09/244,656

(22) Filed: Feb. 4, 1999

(30) Foreign Application Priority Data

Feb. 12, 1998 (EP) .................................................. 98850020

(51) Int. Cl.⁷ ...................................................... F04D 29/38
(52) U.S. Cl. .................... 416/183; 416/185; 416/223 B; 416/235
(58) Field of Search ..................................... 416/183, 185, 416/223 B, 235, 237, 228, 227 R; 73/861.79, 861.351, 861.352, 861.353, 861.354

(56) References Cited

U.S. PATENT DOCUMENTS

| 2,832,218 | * | 4/1958 | White ............................. 73/861.351 |
| 2,877,649 | | 3/1959 | Powers . |
| 4,468,972 | | 9/1984 | Fisher et al. . |
| 4,574,896 | * | 3/1986 | Friedrich ............................. 177/16 |
| 5,191,802 | | 3/1993 | Fassbinder . |
| 5,359,900 | * | 11/1994 | Hafner ............................. 73/861.37 |
| 5,380,957 | | 1/1995 | Giles . |
| 5,540,550 | * | 7/1996 | Kubota ............................. 416/179 |
| 5,728,951 | * | 3/1998 | Van Cleve et al. ............. 73/861.354 |

FOREIGN PATENT DOCUMENTS

| 1 211 415 | 2/1966 | (DE) . |
| 195 42 290 A1 | 5/1997 | (DE) . |

* cited by examiner

*Primary Examiner*—F. Daniel Lopez
*Assistant Examiner*—Ninh Nguyen
(74) *Attorney, Agent, or Firm*—Pillsbury Madison & Sutro LLP

(57) ABSTRACT

The invention relates to an impeller being rotated around an axis for a mass flow measuring device receiving inflow of material through an inlet tube. To improve the measurement accuracy, the fan character of the impeller is reduced. This is obtained by two design principles which can be combined. The impeller includes a number of mainly radially directed vanes. That side of each vane along which the measured material flows is formed as a duct with a cross-sectional area which decreases in the direction from the center of the impeller. The other principle is to reduce the airflow by use of an upside down bowl shaped cowling placed over the impeller.

10 Claims, 4 Drawing Sheets

IMPELLER ARRANGEMENT IN A MEASURING DEVICE

BACKGROUND OF THE INVENTION

1. Field of the Invention

The present invention relates to an apparatus for measuring a mass flow, in particular bulk material or a fluid, and the invention especially relates to an impeller arrangement used in a measuring device in which the mass flow rate is measured by using the Coriolis force measuring principle.

2. Discussion of the Related Art

Such a prior measuring device is known from our copending European patent application No. 96850202.1 filed on Nov. 29, 1996, describing the main principles for such a mass flow meter, and to which application herewith is referred.

In such a measuring device the particles to be measured are subjected to tangential acceleration in a whirling impeller, and torque exerted on the vanes of the impeller in reaction to the Coriolis force of accelerated particles is measured as an indication of the mass flow rate.

The object our above European patent application was to avoid measurement errors, due to uneven distribution in the inlet tube of the material to be measured.

The subject of this invention is another source of measuring error, which mainly occurs in the lower end of the measuring capacity of a Coriolis measuring device, i.e. at small flows of the material. This error is due to the air (gas) circulation through the impeller having the character of a fan. When accelerating the air its mass and also its whirling generate a torque on the motor. If this torque were constant at a certain speed of rotation of the axis of the motor it should be a part of the zero measuring signal together with that from the axis bearing friction. However that is not the case. The streaming air along the vanes of the impeller is also influencing the acceleration of the material particles which simultaneously are launched out from the center of the impeller. Thereby a flow measuring error occurs and this is especially noticeable as an non-linearity of the flow versus the measuring signal characteristic in its lower end.

It is known that from the patent application DE 1 211 415 to even out the air pressure difference between the upper compartment above the impeller and its underlying compartment. This method stabilises the air stream but does not influence its magnitude and therefore it will not influence the acceleration of the material along the vanes of the impeller.

It is also known from the patent U.S. Pat. No. 4,468,972, which deals with a flow meter for liquids, that the impeller consists of a circular floor on which a cup with a mainly circular shape has an upper circular opening and two opposing elongated portions terminating in opposing spouts (FIG. 4 and 5). By this arrangement the vane character of the impeller will become reduced. However, this design will only function for a liquid, as material particles which fall down along the circular part of the cup between the elongated portions are blocked from moving in radial direction and an amount of material will permanently remain in these areas. Even if such permanent collections of material would not disturb the function of the impeller the mass of that material will change the moment of inertia of the rotating impeller and thereby cause a change of the zero point of the output signal. Such error of stochastic character can not be eliminated. Another drawback with the curved shape of the vanes mean that the material particles sliding along a nonradially directed vane will get a lower acceleration and thereby an more unpredictable Coriolis force.

SUMMARY OF THE INVENTION

The object of the present invention is therefore to further improve, the measurement accuracy of the material introduced into the impeller from the inlet tube by considerably reducing the fan character of the impeller. This is done by modifying the shape of the impeller and introducing an upper plate consisting of an upside down turned bowl which covers the impeller and with a radius which extends over that of the edge of the vanes. The improvements are particularly related to the lower part of the measuring capacity of a Coriolis mass flow meter.

The above object has been obtained in that the invention has been given the characterizing features in the appended claims.

BRIEF DESCRIPTION OF THE DRAWINGS

The invention will now be described with reference to the enclosed drawings, in which.

DETAILED DESCRIPTION

Figure 1:
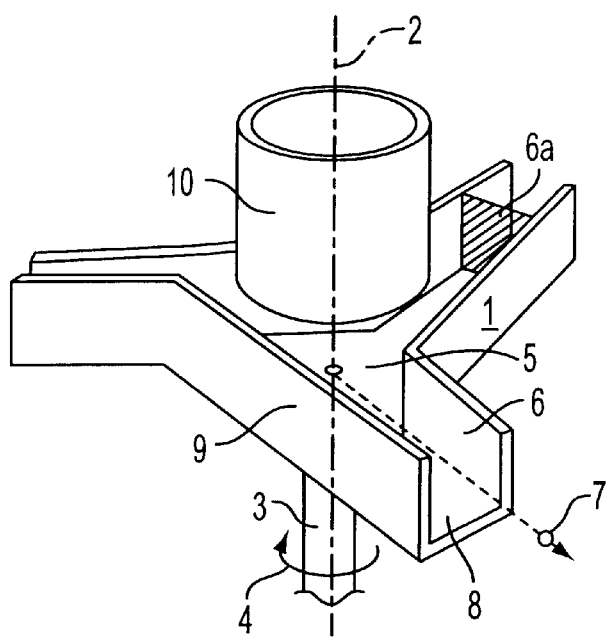
FIG. 1 shows a schematic perspective view of a part of an impeller having open ducts according to the invention.

The impeller 1 shown in FIG. 1 is intended to be a part of a complete device for measuring a mass flow of the kind described in our copending European patent application No. 96850202.1. The impeller 1 is mounted for rotation around an axis of rotation 2, mounted on shaft 3, which rotates according to the arrow 4. The impeller is provided with a central receiving area 5, and three vanes 6 which are extending radially from the axis 2. Particles hitting the central area 5 are launched along the surface of the vane 6 as shown by the line 7 because of the rotation of the impeller. The vanes 6 are completed with bottoms 8 and sides 9 thus forming ducts. The side 9 is directed so that the cross-sectional area 6a of the duct, marked with lines, is decreasing with increasing distance from the center 2. Above the central receiving area 5 an inlet tube 10 is situated.

Figure 2:
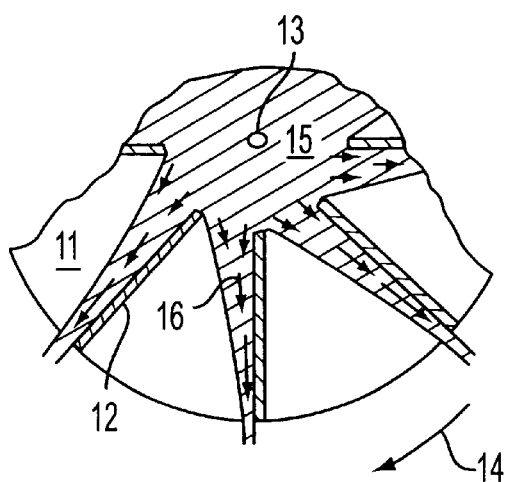
FIG. 2 shows an impeller with conventional vanes and how the material flow is distributed along the vanes when the impeller is rotating.

The cross-sectional area of the material flow is changing during flowing along radially directed vanes, and how is shown from above on FIG. 2. A part of the impeller 11 is shown with radially directed vanes 12 and it is rotating around the center 13 with the rotational direction shown by the arrow 14. The area marked with lines 15 represents the flowing material with such amount that it is filling up the area between the inner edges of the vanes when it flows out in radial direction. The speed of the particles in radial direction, marked by the arrows 16, is increasing due to the radially directed centrifugal force which is acting on the particles. With the flow assumed constant with time, i.e. the volume per unit of time is constant, the cross-sectional area will decrease in proportion to the increasing speed and distance from the center. Without influencing the behaviour of the flow thus the expanding distance between the vanes at increasing radius can be reduced to a decreasing distance by introducing the ducts 8,9 in FIG. 1. Thereby the fan quality of the impeller will be reduced. As the streaming air will produce a force on the particles in the same direction as the centrifugal force on the particles and the speed produced of centrifugal force is strictly related to the tangentially directed force which is the measurement of the flow, the magnitude of the streaming air will introduce a measuring error.

Figure 3:
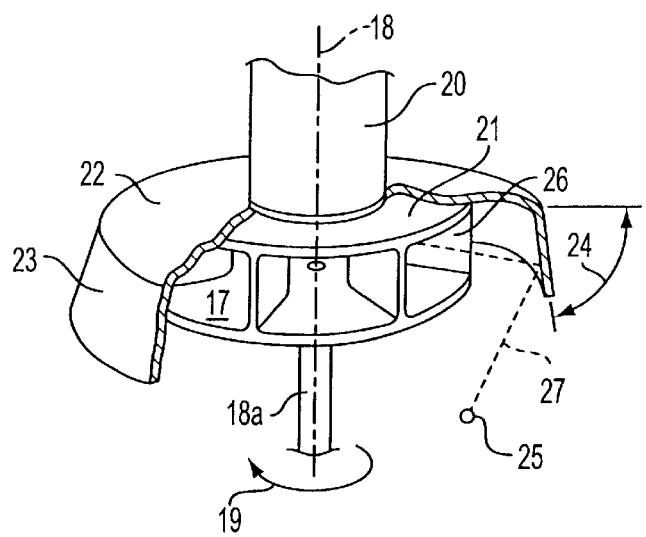
FIG. 3 shows a schematic perspective view of an impeller covered with a bowl whose sides break the air streaming radially out from the impeller.

FIG. 3 shows a part of the impeller 17 of known shape mounted for rotation around an axis of rotation 18 the impeller in mounted on shaft 18a rotated according to the arrow 19 and with the inlet tube 20. On the upper plate 21 of the impeller is a bowl 22 with a center hole of the same size as that of the upper plate 21. The side walls 23 of the bowl have their sides angled as shown by the arrow 24. A particle 25, which is launched out from the vane 26, as shown by the dashed line 27 bounce off the side wall 23. If the angle 24 then is less than 90 degrees, the particle will proceed in a downward direction. As the particle is accelerated to the tangential velocity corresponding to the radius of the vane 26, when it: is leaving the edge of the vane, the impact from the mass of the particle when it hit the side wall 23, will not cause a tractive force in the tangential direction. However, for the air which is streaming out from the impeller, the side wall 23 will act as a resistance and thereby reducing its magnitude. Another positive effect of the method of changing the direction of the particles by the rotating side wall 23 is that the particles are given a higher velocity than when they are bouncing against the surrounding walls and the higher velocity reduce the risk for material hang up along the surrounding walls.

Figure 4:
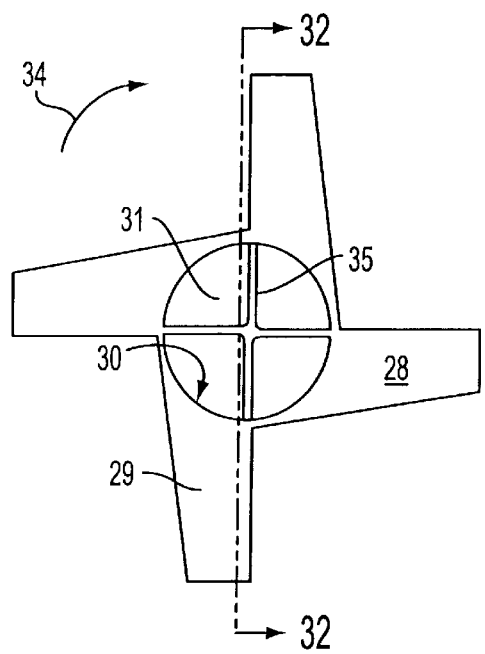
FIG. 4 shows a schematic view from above of an impeller with four closed ducts and FIG. 5 a cut through FIG. 4.
Figure 5:
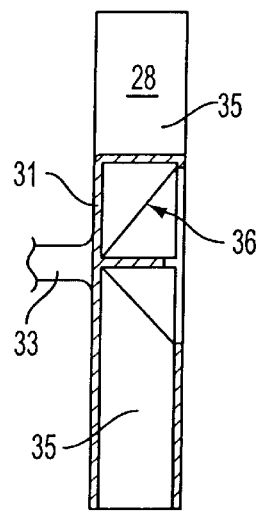

In FIG. 4 is shown an impeller 28 similar the one in FIG. 1, but with four closed ducts 29 formed as rectangular tubes with decreasing cross-sectional area along the distance from the center. The upper flat plate formed of the joint parts of the ducts 29 is provided with a circular hole 30 for the inlet tube (not shown). The under side of the tubes also forms a flat plate 31. A cut 32-32 is shown in FIG. 5 where the shaft 33, which is mounted at the center of the plate 31, is seen. The shaft is rotated in the direction of the arrow 34 shown in FIG. 4. The radially directed side walls 35 of the ducts have a successively increasing height 36 from the center of the impeller to the edge of the hole 30.

Figure 6:
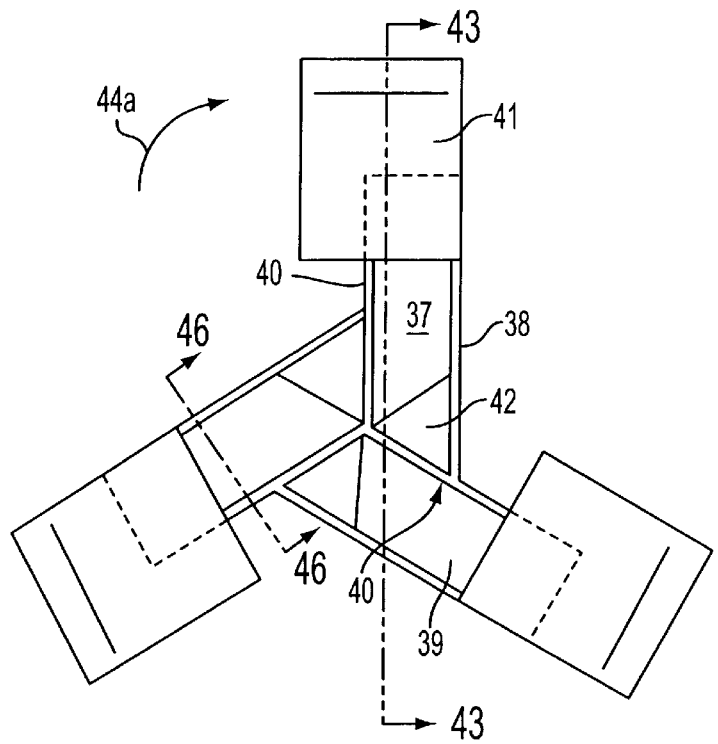
FIG. 6 shows a schematic view from above of an impeller with three open ducts provided with an alternative realization of the bowl shown in FIG. 3, FIG. 7 a cut through FIG. 6 and FIG. 8 a detail of the center part of FIG. 6.
Figure 7:
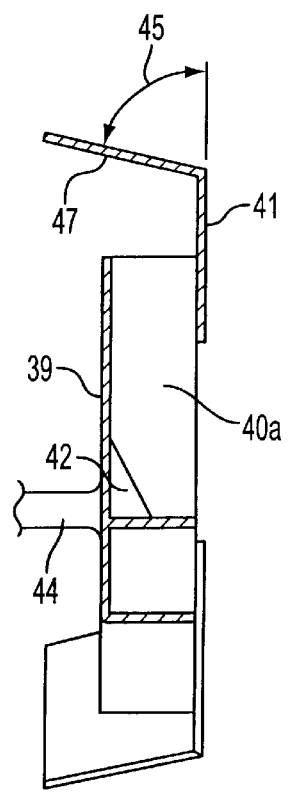
Figure 8:
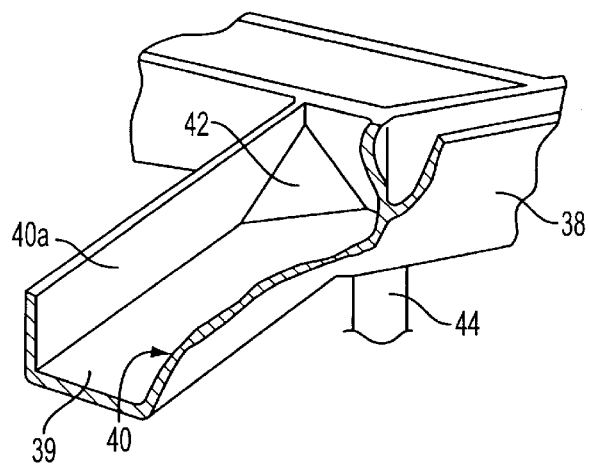

In FIG. 6 is shown an impeller 37 with three open ducts 38 formed as U-beams and the joint parts forming a flat under side 39 and side walls 40 and 40a. The radially directed side walls 40 are extending from center of the impeller, which is to be rotated as shown by the arrow 44a. At the ends of the ducts 38 bent plates 41 are placed and on the center area are triangular plates 42. FIG. 7 is a cut 43-43 through FIG. 6 where the shaft 44 is seen at the center of the under side 39. The angle of the bent plate 41 is marked by the arrow 45. FIG. 8 is a view 46-46 in FIG. 6 which shows the triangular plate 42. The plates 41 have the same function as the bowl 22/23 in FIG. 3. When the material particles are hitting the under side of the bent part 47 their direction is changed downward and they will cause an increase in the resistance for the streaming air through the duct. The plates 42 are put in to fill the pocket in the corner between the ducts where material may accumulate as the acceleration of the particles is stopped by the corner. By giving the plates a proper angle related to the sides of the ducts the particles will slide in radial direction.

Figures 9, 10:
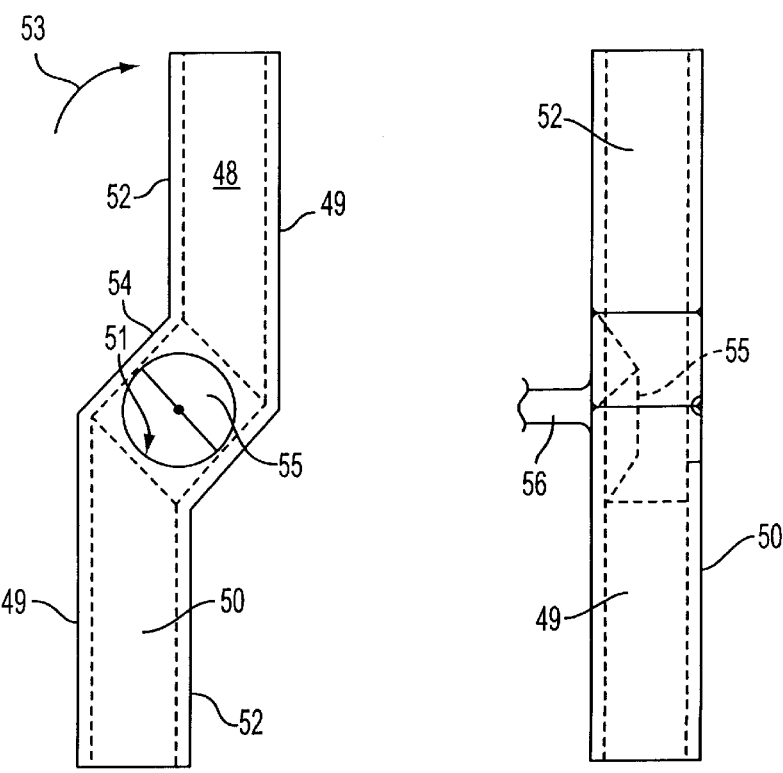
FIGS. 9 and 10 show an impeller with two ducts in two projections.

In FIG. 9 is shown an impeller 48 with two ducts 49, which are covered with a plate 50, and having a center hole 51 for the inlet tube (not shown). The sides 52 are directed radially and the impeller is to be rotated according to the arrow 53. Between the ducts 49 there are two side plates 54 and a bent plate 55. FIG. 10 shows a side view of impeller 48 where the shaft 56 is shown. The bent plate 55 at the center is bent in an angle of suitable magnitude higher than that of the angle of repose of the materials which are measured. The function of the plate 55 is to avoid material accumulation at the inner walls of plates 54.

What is claimed is:

1. An impeller, constructed and arranged to rotate around an axis, for a mass flow measuring device receiving inflow of material through an inlet tube, comprising:

a plurality of vanes which are arranged to transport the material from a central receiving area to a circumferential edge of the impeller, the vanes having sides, against which the material flow is tangentially pressed, the sides being substantially radially directed from the center of the axis, the vanes being, at least partly surrounded by side walls forming a duct, and the cross-section of the ducts being decreasing in area in a radial direction as distance from the axis increases.

2. An impeller constructed and arranged to rotate, around an axis, for a mass flow measuring device receiving inflow of material through an inlet tube comprising:

a plurality of vanes which are arranged to transport the material from a central receiving area to a circumferential edge of the impeller, a circular bowl, covering the upper side of the impeller, and having a bottom, the bowl provided with a central hole in the bottom for the inlet tube and having a radius, which is not less than a radius of an outer edge of each of the vanes, side walls of the bowl having a length of at least a height of the vanes, the angle between the sides and the bottom is less than about 80 degrees.

3. An impeller according to claim 1 or 2, wherein the inner edge of the vanes is rises from a central region of the impeller towards the outer edge of the inlet tube.

4. An impeller according to claim 1 or 2, wherein inner edges of the vanes have an essentially constant height from a central region of the impeller towards the outer edge of the inlet tube.

5. An impeller according to claim 1 or 2, wherein the ducts are formed as quadrangular tubes having a cross section decreasing in area as distance from the center increases.

6. An impeller according to claim 2, wherein the ducts are formed as U-shaped beams with a vane wall extending in a radial direction from the center, one parallel bottom plate and one parallel counter wall.

7. An impeller according to claim 2, wherein the bowl is split in separate parts covering the ducts and extending outside the radius of the outer edge of the vanes.

8. An impeller according to claim 1 or 2, wherein a part of the receiving area is covered of essentially triangular, tilted plates.

9. An impeller according to claim 1 or 2, wherein the receiving area is covered by an essentially rectangular, bent plate.

10. An impeller according to claim 1 or 2, wherein upper and lower sides of the ducts are directed non-perpendicular to the axis of rotation.

* * * * *